Mitchell

3,821,151

June 28, 1974

[54] SMOKE RETARDANT COMPOSITIONS
[75] Inventor: Lawrence C. Mitchell, Mt. Vernon, Ind.
[73] Assignee: Ethyl Corporation, Richmond, Va.
[22] Filed: Apr. 30, 1973
[21] Appl. No.: 355,651

Related U.S. Application Data
[63] Continuation-in-part of Ser. No. 196,801, Nov. 8, 1971.

[52] U.S. Cl. ... 260/31.8 R, 106/15 FP, 260/30.6 R, 260/41 B, 260/45.75 R, 260/45.75 C
[51] Int. Cl. ........................ C08f 45/40, C08f 45/56
[58] Field of Search .... 260/41 B, 45.75 R, 45.75 C, 260/31.8 R, 30.6 R; 106/15 FP

[56] References Cited
UNITED STATES PATENTS

| | | | |
|---|---|---|---|
| 2,157,997 | 5/1939 | Brous | 260/45.75 C |
| 2,286,744 | 6/1942 | Leatherman | 260/41 B |
| 2,302,361 | 11/1942 | Yngve | 260/41 B |
| 2,610,920 | 9/1952 | Hopkinson | 106/15 FP |
| 3,331,693 | 7/1967 | Taylor | 106/15 |
| 3,622,537 | 11/1971 | Needham | 260/41 B |

*Primary Examiner*—Allan Lieberman
*Assistant Examiner*—J. H. Derrington
*Attorney, Agent, or Firm*—Donald L. Johnson; Robert A. Linn

[57] ABSTRACT

Iron powder admixed with a copper and/or a molybdenum compound imparts smoke retardant properties to combustible materials such as plastics. Thus, for example, polyvinyl chloride does not emit as much smoke during combustion when it is compounded with cast iron powder admixed with a copper oxide and/or a molybdenum oxide.

4 Claims, No Drawings

SMOKE RETARDANT COMPOSITIONS

CROSS-REFERENCE TO RELATED APPLICATION

This application is a continuation-in-part of application Ser. No. 196,801, filed Nov. 8, 1971.

BACKGROUND OF THE INVENTION

This invention provides additives for plastics that will decrease their tendency to smoke when burned. It is believed that such use of the additives provided has not been described in the art.

Netherlands Pat. No. 69/18,861 is reported to teach that preparations of antimony trioxide and an inorganic salt impart flame and smoke reducing properties to resin compositions.

Iron oxide and other oxides have been added to polyvinyl halide for pigment purposes; Woernle, SPE Journal, pages 535–544 (May 1960); DeCaste and Hansen, Ibid., 18 No. 4, pp. 431–439 (April 1962).

SUMMARY OF THE INVENTION

In one aspect, this invention provides polyvinyl halide compounded with a mixture of iron powder and copper oxide and/or molybdenum oxide. Cuprous oxide is the preferred copper oxide for the above compositions.

This invention also provides a method for imparting smoke retardancy to plastics which method comprises blending resins with compounds such as set forth above. Similarly, this invention provides blends of iron and copper and/or molybdenum compounds for incorporation in resins. Such blends may be mixtures of the agents themselves or the mixtures can be combined with the resin or other materials such as a solvent, or a plasticizer or other ingredient utilized to form a resin composition.

Smokes can be a hazard during a fire. Dense smoke hampers fire fighting measures and can obscure escape routes for those within a burning enclosure. Therefore, building materials which emit lesser amounts of smoke during combustion can be a safety feature. This invention serves to provide compositions with lessened tendencies to smoke and accordingly one utility of this invention pertains to improvement in materials utilized in construction. However, formulations of this invention can be used wherever it is desirable to use materials which can lessen the amount of smoke produced upon combustion.

DESCRIPTION OF PREFERRED EMBODIMENTS

In the practice of this invention, a smoke retardant amount of additive is used to treat a combustible material such as a plastic resin.

Polyvinyl halide resins can be used in this invention. Applicable polyvinyl halides include homopolymers, copolymers and polymer mixtures. Illustrative and non-limiting examples of applicable polyvinyl halide resins are:

1. Homopolymers — Polyvinyl chloride, polyvinyl bromide, polyvinyl fluoride, polyvinylidene chloride, polydichlorostyrene and the like,
2. Copolymers — Vinylchloride-vinyl acetate, vinylchloride-vinyl alcohol, vinylchloride-vinylidene chloride, vinylchloride-diethyl maleate, vinyl chloride esters of unsaturated alcohols and unsaturated acids and the like, and
3. Mixtures — Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

The resins can be treated with the smoke retardant additive or additives in any convenient manner. In some instances, smoke retardancy may be achieved by treating one or more surfaces of a plastic article with the additive or additives such that a treated surface is overlayed or padded with the additive composition. However, in general, it is preferred to blend an additive within a resin composition. The blending can be accomplished by any appropriate blending or mixing technique available in the art.

In the practice of this invention, a smoke retardant amount of provided additive is used to treat a combustible substance. In general, there is usually a relationship between the smoke retardancy achievable and the amount of additive employed. Therefore, at least within some concentration range, usually a greater amount of additive will provide a greater amount of smoke retardancy, all other factors remaining the same. In some instances, there is a practical upper limit on the amount of additive used. This upper limit is based on secondary factors such as cost, ease of blending, or interference with some other desirable property of the substrate, for example. In many instances, from about 0.5 to about 40 parts are used for each 100 parts of substrate resin. Preferably, from about 1 to about 30 parts for 100 parts resin, more preferably 1 to about 15 parts per 100 parts resin are employed. However, greater or lesser amounts can be used if desired.

Any iron powder or finely divided form of iron can be used in this invention. In some instances, cast iron powder works better than other forms and therefore, is preferred.

For this invention a smoke retardant amount of an additive mixture is added to a polyvinyl halide as described above. For binary mixtures such as iron-copper compound or iron-molybdenum compound there can be from 1 to 99 parts by weight of the first substance to 99 to 1 parts by weight of the second. For example, within this range an exemplary additive mixture is cuprous oxide-iron (50:50). The numbers in parentheses refer to parts by weight. Thus, this mixture contains 50 parts of $Cu_2O$ and 50 parts of iron. In the ternary mixtures of iron with a copper and molybdenum compound each component can have from 1 to 98 parts by weight. Thus, the mixtures can be

A, B, C (1:1:98)
A, B, C (1:98:1)
A, B, C (98:1:1)

where A signifies iron, B a copper compound, and C a molybdenum compound. An exemplary ternary mixture of this invention is iron-molybdenum trioxide-cuprous oxide (20:40:40), wherein the numbers in the parenthesis refer to parts by weight as referred to above.

Cuprous or cupric oxide can be used. Cuprous oxide has been shown to give a better response in some testing, hence it is preferred. The applicability of such oxides suggests the use of other copper compounds such as the corresponding cyanides, sulfides, Cu(I) and Cu(II) chelates such as the acetonylacetates, copper salts of carboxylic acids such as the formates, oxalates, acetates and butyrates, hydrates of all these, and organocopper compounds such as the copper carbonyls.

Molybdenum trioxide, $MoO_3$, can be used in this invention. Also, it has been found that molybdenum carbonyl and ammonium paramolybdate reduce smoke.

Applicability of such compounds suggest other molybdenum compounds can be blended; for example, oxides and sulfides, viz, $MoO_2$, $Mo_2O_5$, $Mo_2O_3$, $MoS_2$, $MoS_4$, $Mo_2S_3$, metal molybdates such as ammonium and copper molybdate, sodium and copper paramolybdate, molybdenum salts of carboxylic acids such as acetates and butyrates, chelates such as the acetylacetonates and organomolybdenum compounds. Additional suggested molybdenum compounds are as follows:

TABLE 1

Dimeric ammonium 5-molybdocobaltate (III)
$(NH_4)_6[Co_2Mo_{10}O_{36}] \cdot XH_2O \cdot (X = 6-10)$
Molybdenum oxalate
$H_2[MoO_3(C_2O_4)(H_2O)] H_2O$
Ammonium 9-molybdonickelate(IV)
$(NH_4)_6[NiMo_9O_{32}] \cdot 6.5 H_2O$
Ammonium 6-molybdocobaltate (III)
$(NH_4)_3[CoMo_6O_{24}H_6] \cdot XH_2O$ $(X = 5-7)$
Ammonium 6-molybdonickelate (II)
$(NH_4)_4[NiMo_6O_{24}H_6] \cdot XH_2O$ $(X = 4-6)$
Ammonium 6-molybdoaluminate (III)
$(NH_4)_3[AlMo_6O_{24}H_6] \cdot XH_2O$ $(X = 4-7)$
Ammonium 6-molybdochromate (III)
$(NH_4)_3[CrMo_6O_{24}H_6] \cdot XH_2O$ $(X = 4-7)$
Ammonium 6-molybdoferrate (III)
$(NH_4)_3[FeMo_6O_{24}H_6] \cdot XH_2O$ $(X = 5-10)$

| PVC* Formulas | EXAMPLE Rigid | 20 wt. % DOP** | 33 wt. % DOP |
|---|---|---|---|
| Ethyl PVC 500 natural | 100 parts | | |
| Ethyl PVC SM-250 | | 100 parts | 100 parts |
| Dioctyl phthalate (DOP) | | 30 parts | 50 parts |
| Mark WS (Stabilizer) | | 1.0 part | 1.0 part |
| Stearic acid (Lubricant) | | 0.5 part | 0.5 part |
| Smoke retardant | as indicated | as indicated | as indicated |

* polyvinyl chloride
** di-isooctylphthalate

The smoke retardants were mixed by hand with the appropriate substrate and then mixed by Waring Blendor, Brabender Plastograph, or plastic mill. The homogeneous mixture was moled in a heated press under pressure. The resulting sheet was conditioned in an air circulated oven at 70°C. overnight and at 73°F. and 50 percent relative humidity overnight.

Smoke Tests

A. XP-2 Chamber

Samples 3½ × 1 × ¼ were cut into three 1 × 1 × ¼ specimens. These were burned under controlled conditions in the XP-2 smoke chamber according to ASTM method D2843-70. The average of three values was reported.

A wire basket was inverted over the samples on the wire screen to prevent the PVC from "bending away" from the flame.

Maximum light obscuration, Am, was determined by visual observation of the meter on the apparatus. The time to reach 70 percent light obscuration, $^tA = 70$, was measured off the chart from the recorder. The recorder automatically plotted curves of light absorption versus time.

B. Aminco NBS Chamber

Specimens 3 × 3 square and 50 mil thick were cut. The conditioned specimen was placed on aluminum foil cut to size to permit overlapping of the specimen face on all four sides. The wrapped specimen was placed in a holder and burned in the Aminco NBS smoke chamber according to the directions supplied. The amount of smoke was measured by a photomultiplier. Specific optical density was calculated and corrected for soot remaining on the lens at the end of the test. The average of two values was reported.

Rigid polyvinyl chloride without a smoke suppressant additive had a SODc of 554. When cast iron powder at 1 percent concentration was added thereto, the SODc was 572, indicating that for rigid polyvinyl chloride, iron powder may not have a smoke retardant effect. Accordingly, when it is desirable to achieve smoke retardation of polyvinyl chloride with iron powder, it is usually expedient to admix the iron powder with a copper or molybdenum compound as defined above.

As indicated below, iron powder in flexible, i.e., plasticized, polyvinyl chloride compositions yields smoke retardancy. In general, polyvinyl chloride compositions having 5-30 or more parts per hundred plasticizer yield flame retardant mixtures when compounded with iron powder. The exact nature of the plasticizer is not known to be critical. Diisooctylphthalate is a suitable plasticizer, and its usability suggests other plasticizers such as tricresyl phosphate and the other plasticizers set forth in column 6, line 58, to column 7, line 7, of U.S. Pat. No. 3,338,845. That portion of the patent is incorporated by reference herein as if fully set forth.

Flexible polyvinyl chloride with 20 weight percent (30 parts per hundred) DOP, as set forth in the composition above, had a SODc of 586. In contrast, when equal parts by weight of cast iron powder and cuprous oxide were added such that there was 7.5 parts per hundred resin of each additive, the SODc was reduced to 348. (By this test a smaller SODc means less smoke).

Similar results are obtained when the amount of DOP is from about 2 to about 50 parts per hundred resin. Similar results are obtained when iron powder-cuprous oxide, or
iron powder-molybdenum trioxide mixtures are used in which the amount of each component in said mixture is from 25 to 75 parts by weight. Similar results are obtained when iron powder-cuprous oxide- and molybdenum trioxide mixtures are used when the amount of each component in said mixture is from about 10 to about 80 parts by weight.

Similar results are obtained when the concentration of smoke retardant is 0.5 to 40 parts per hundred resin.

Similar results are obtained when the cuprous oxide in the above mixtures is replaced with cupric oxide or these oxides are replaced with other compounds such as the corresponding sulfides, cyanides, Cu(I) and Cu(II) chelates such as the acetonylacetates, copper salts of carboxylic acids such as the formates, acetates, butyrates, oxylates and the like, hydrides of all these, and organo compounds such as the copper carbonates. Also, similar results are obtained when the molybdenum trioxide in the above examples is replaced with $MoO_2$, $Mo_2O_3$, or these oxides are replaced with the corresponding sulfides or other molybdenum compounds such as ammonium and copper molybdate, ammonium paramolybdate, copper paramolybdate, molybdenum salts of carboxylic acids, such as acetates and butyrates, chelates such as the acetylacetonates and the organomolybdenum compounds such as molybdenum hexacarbonyl. Likewise, similar results are obtained when the molybdenum compounds in the mixtures are replaced with those molybdenum compounds listed in Table 1 above.

This invention may be extended to smoke retardant materials wherein the molybdenum is in a complex salt of acids such as those found on pages 526–535 of *Fritz Ephraim, Inorganic Chemistry*, 6th Edition by P. C. L. Thorne and E. R. Roberts, Interscience Publishers Inc., New York, N.Y.; 1954. Exemplary salts of this type are ammonium 5-molybdocobaltate (III), 9-molybdonickelate (IV), 6-molybdoaluminate (III) and 6-molybdochromate (III).

I claim:

1. As a composition of matter, a polyvinyl halide resin having 5–30 parts of plasticizer per hundred parts of resin admixed with from about 0.5 to about 40 parts per hundred parts of resin of a mixture of iron powder and molybdenum oxide wherein the relative amounts each of said iron and said oxide in said mixture is from 1 to 99 parts by weight.

2. A composition of claim 1 wherein the relative amounts each of iron powder and molybdenum oxide is from 25–75 parts by weight.

3. As a composition of matter, a polyvinyl halide resin having 5–30 parts of plasticizer per hundred parts of resin admixed with from about 0.5 to about 40 parts per hundred parts of resin of a mixture of iron powder, molybdenum oxide and copper oxide wherein the relative amounts each of said iron powder and said oxides in said mixture is from 1 to 98 parts by weight.

4. A composition of claim 3 wherein said mixture contains 20 parts by weight of iron powder, 40 parts by weight of molybdenum trioxide and 40 parts by weight of cuprous oxide.

* * * * *